(12) United States Patent
Koch et al.

(10) Patent No.: US 7,452,428 B2
(45) Date of Patent: Nov. 18, 2008

(54) METHOD FOR COATING METAL SUBSTRATES WITH A RADICALLY POLYMERIZABLE COATING AGENT AND COATED SUBSTRATES

(75) Inventors: Matthias Koch, Glastonbury, CT (US); Kerstin Motzkat, Oberhausen (DE)

(73) Assignee: Henkel KGaA (DE)

( * ) Notice: Subject to any disclaimer, the term of this patent is extended or adjusted under 35 U.S.C. 154(b) by 0 days.

(21) Appl. No.: 11/151,713

(22) Filed: Jun. 13, 2005

(65) Prior Publication Data

US 2006/0014893 A1 Jan. 19, 2006

Related U.S. Application Data

(63) Continuation of application No. PCT/EP03/13616, filed on Dec. 3, 2003.

(30) Foreign Application Priority Data

Dec. 13, 2002 (DE) .................. 102 58 291

(51) Int. Cl.
C08J 7/18 (2006.01)
C08F 2/48 (2006.01)
C23C 22/17 (2006.01)
(52) U.S. Cl. ................. 148/274; 148/243; 148/275; 427/487; 427/512; 427/521
(58) Field of Classification Search ............. 148/243, 148/247, 259, 275, 274; 427/385.5, 558, 427/487, 512, 521
See application file for complete search history.

(56) References Cited

U.S. PATENT DOCUMENTS

| | | | |
|---|---|---|---|
| 3,912,548 A | 10/1975 | Faigen | |
| 4,945,017 A | 7/1990 | DesLauriers et al. | |
| 5,344,504 A | 9/1994 | Deck et al. | |
| 5,427,632 A | 6/1995 | Dolan | |
| 5,683,816 A | 11/1997 | Goodreau | |
| 5,868,872 A | 2/1999 | Karmaschek et al. | |
| 5,987,727 A | 11/1999 | Shafik et al. | |
| 6,242,101 B1 | 6/2001 | Schwalm et al. | |
| 6,365,234 B1 | 4/2002 | Schieferstein et al. | |
| 6,475,299 B1 | 11/2002 | Lee et al. | |
| 6,677,045 B1 | 1/2004 | Meisenburg et al. | |
| 6,875,479 B2 | 4/2005 | Jung et al. | |
| 2003/0150524 A1 | 8/2003 | Wichelhaus et al. | |
| 2003/0185990 A1* | 10/2003 | Bittner et al. ............ 427/385.5 |
| 2004/0013815 A1 | 1/2004 | Gros | |

FOREIGN PATENT DOCUMENTS

| | | |
|---|---|---|
| CA | 2 374 327 | 11/2000 |
| CA | 2 375 681 | 12/2000 |
| DE | 24 33 704 C3 | 5/1981 |
| DE | 197 36 083 A1 | 2/1999 |
| DE | 197 51 153 A1 | 5/1999 |
| DE | 198 14 872 A1 | 10/1999 |
| DE | 199 23 118 A1 | 11/2000 |
| DE | 199 25 631 A1 | 12/2000 |
| DE | 100 10 758 A1 | 9/2001 |
| EP | 0 783 534 B1 | 6/1995 |
| EP | 0 694 593 A1 | 1/1996 |
| EP | 0 792 922 A1 | 9/1997 |
| JP | 2000 154336 A | 6/2000 |
| WO | WO 95/04169 A1 | 2/1995 |
| WO | WO 95/14117 A1 | 5/1995 |
| WO | WO 01/32321 A2 | 5/2001 |
| WO | WO 01/85853 A2 | 11/2001 |
| WO | WO 01/91926 A1 | 12/2001 |
| WO | WO 02/24344 A2 | 3/2002 |

* cited by examiner

*Primary Examiner*—Roy King
*Assistant Examiner*—Lois L. Zheng
(74) *Attorney, Agent, or Firm*—Mary K. Cameron

(57) ABSTRACT

The invention relates to a method and coating agents used in the method which provide good adherence to and good corrosion protection of metal substrates; the coating coating agents are cross-linkable via radical polymerization. Adhesion promoting compounds are present in the conversion layer in a quantity of about 0.01 to 40 weight percent and contain, on average, one reactive unsaturated group and at least one H-active group per molecule.

22 Claims, No Drawings

METHOD FOR COATING METAL SUBSTRATES WITH A RADICALLY POLYMERIZABLE COATING AGENT AND COATED SUBSTRATES

CROSS-REFERENCE TO RELATED APPLICATIONS

This application is a continuation of and claims priority from International Application Number PCT/EP2003/013616, published in a non-English language, having an international filing date of Dec. 3, 2003, and claims priority to DE 10258291.2 filing date Dec. 13, 2002.

FIELD OF THE INVENTION

The invention lies in the field of the anticorrosive treatment of metal surfaces, which are coated with an anticorrosive conversion layer and then with a radically polymerizable coating agent, the conversion layer acting as adhesive base for the subsequent coating agent layer.

BACKGROUND OF THE INVENTION

In the construction, domestic appliance and automotive industries, metal substrates are increasingly being used, and increased demands are being made of such substrates in terms of corrosion protection. In addition to known hot galvanized or electrolytically galvanized steel sheets, coated surfaces with zinc, aluminum alloys are also used. Other metals, especially aluminum substrates or aluminum alloys, may also be employed. There is an extensive prior art relating to the deposition of anticorrosive layers on metal surfaces. In the prior art, substantially aqueous solutions, which may optionally also contain organic polymers, are applied to the surface. The term conversion treatment indicates that the conversion solution reacts chemically with the metal surface during the treatment, with the formation of an anticorrosive layer, which may contain metal atoms of the substrate and optionally polymers.

It is known that the use of chromium compounds or the addition of chromate to the treatment solution results in a substantially better anticorrosive layer and also in better adhesion. In principle, however, it is preferable, because of the physiologically harmful effect of chromium, to avoid using this heavy metal in such processes. Furthermore, attempts are also being made to reduce other heavy metals, for example cobalt, copper, nickel, as far as possible. The chromium-free conversion treatment of metal surfaces with fluorides of boron, silicon, hafnium, titanium or zirconium in conjunction with organic polymers to produce a conversion layer is known. The pretreatment solutions are applied either by the rinse process or by the no-rinse process. In the rinse process, the conversion layer is rinsed after it has formed; in the no-rinse process, the solution is applied and dried without rinsing.

Accordingly, DE-C-24 33 704, for example, describes treatment baths that may comprise polyacrylic acid or its salts as well as ammonium fluorozirconate. The conversion layers that form are said to exhibit improved adhesion of the lacquer to subsequent layers. DE-A-197 51 153 discloses a chromate-free coating for coil-coating steel sheets, in which titanium, manganese and/or zirconium salts of olefinically unsaturated polymerizable carboxylic acids and further olefinic monomers are applied together with initiators and are subsequently crosslinked by UV radiation. In both cases, further lacquer layers can subsequently be applied.

WO 01/85853 describes a method of coating metal sheets with a chromate-free UV-curing coating agent that comprises polyester acrylates and polyurethane acrylates and that forms an anticorrosive layer on the substrate after crosslinking.

WO 01/32321 describes a method of coating metal substrates wherein a second coating agent is applied to a first coating agent after curing, the second coating agent being curable by radiation. Before being coated with the coating agents, the metal substrate is treated with a conventional inorganic pretreatment solution in order to produce a conversion layer.

WO 02/24344 describes a method for the multi-layer lacquering of metal surfaces in which at least one lacquer-like layer is applied to the substrate, wherein either the substrate is provided beforehand with an anticorrosive layer or no anticorrosive layer is used. The anticorrosive layer and the lacquer-like layer are both crosslinked, UV-crosslinking binders together with photoinitiators being used for the lacquer-like layer. The lacquer-like layer may optionally additionally also comprise corrosion inhibitors and/or conductive particles.

A problem with the use of conversion protective layers and UV-curing coating agents is the adhesion of the coating agent to the metal substrate. In the case of chromate-free pretreatments in particular, adhesion is often poor. In addition, even slight defects in the adhesion or cracks in the coating lead to increased corrosive attack on the underlying metal substrate. Such cracks and defects of adhesion can occur, for example, directly in the process of curing by actinic radiation as a result of shrinkage, or when the metal substrates are mechanically formed. Difficulties in terms of adhesion are encountered especially when the corresponding substrates are in the form of sheets or strips and are to be protected against corrosion and coated in that form, because such strips or sheets must subsequently be cut and brought into the appropriate later form. A further problem lies in the coating of coil-coating materials themselves because, due to the process, only very short reaction times are available in this application. It is furthermore desirable to keep the number of successive method steps as low as possible. The pretreatment solutions are generally acidic solutions, so that the adhesion problems cannot simply be solved by the addition of known adhesion agents, for example silane compounds.

SUMMARY OF THE INVENTION

An object of the present invention is, therefore, to provide a method of applying, in the coating of metal substrates, especially of metal substrates in sheet or strip form, a rapidly curing coating which has the good anticorrosive properties of known conversion layers and is free of chromate, and which exhibits improved adhesion and a high degree of formability, especially in mechanical working of metal substrates.

One object is achieved by a method for coating metal substrates, in which an aqueous chromate-free conversion agent is applied to a cleaned metal surface and a conversion layer is produced that contains from 0.1 to 500 mg/m$^2$ of low molecular weight compounds which are crosslinkable by radical polymerization and additionally contain an H-functional group. A coating agent that is curable by radical polymerization is applied to the conversion layer, and the conversion layer and the coating agent are then radically crosslinked.

The invention further provides a coating agent for producing chromate-free conversion layers on metal substrates, which coating agent is in aqueous acidic form and additionally comprises from 0.01 to 40 wt. % of low molecular weight compounds which can be crosslinked by radical polymerization and contain a further H-functional group.

The invention further provides a two-layer coating on metal substrates, which coating consists of a conversion layer according to the invention and a further coating layer. The invention further provides a method for coating substrates in sheet or strip form with a conversion layer according to the invention and a coating agent that can be crosslinked by actinic radiation.

DETAILED DESCRIPTION OF THE INVENTION

Suitable substrates for the method according to the invention are metal substrates. They may be homogeneous substrates of one composition, but it is also possible for different types of substrate to be present next to one another. The metal surfaces generally consist of aluminum, iron, copper, magnesium, nickel, titanium, zinc or of alloys of these metals. It is further possible to use conventional iron substrates that have been coated, for example, with zinc, aluminum, magnesium or alloys thereof.

The substrates may be flat or they may have a three-dimensional shape. However, the method according to the invention is suitable especially for providing metal substrates in sheet or strip form with a surface coating, for example in a coil-coating process. The substrates can then be brought into other forms later.

As a first step in the method according to the invention, a chromate-free conversion layer is produced on the prepared surface, i.e. a generally dust- and grease-free cleaned surface. The conversion layer should comprise from 0.1 to 500 mg/m$^2$ of coated surfaces of low molecular weight compounds that are crosslinkable by radical polymerization and additionally contain H-functional groups, preferably up to 250 mg/m$^2$, especially from 0.5 to 100 mg/m$^2$. In particular, no polymerization initiators should be present in the conversion layer.

A preferred possibility for producing the conversion layer is the use of an aqueous chromate-free conversion solution comprising from 0.01 to 40 wt. % of low molecular weight compounds that are crosslinkable by radical polymerization and contain H-functional groups. Aqueous conversion solution is to be understood as meaning the known aqueous systems, which are to include molecular solutions, dispersions and/or emulsions. It is preferably applied at a temperature of approximately from 10 to 75° C. The temperature range should especially be from 15 to 50° C. The aqueous conversion solution can be applied to the metal surface by spraying, squeezing, immersion, using a roller, by means of a roll coater or a spray nozzle. Coating by means of a roll coater is preferred especially for flat substrates. Methods of applying such coating agents are described in the literature and can be adapted according to the intended use. The aqueous solution is generally allowed to act on the metal surface for a period of from 0.1 second to 5 minutes, especially from 0.5 second to 30 seconds. It is preferable for the operation to be carried out using the no-rinse process, i.e. subsequent rinsing of the conversion surface is not necessary.

The resulting conversion layer is initially not crosslinked further. It is only very thin, and the layer thickness of the wet film should be less than 5 µm, especially less than 1 µm. The wet film is subsequently dried, optionally also at elevated temperature. The conversion layer produced according to the invention should contain amounts of radically polymerizable compounds. The material coated with the conversion layer according to the invention can be processed further directly or alternatively can be stored.

It is further possible, in order to produce the conversion layer containing radically polymerizable compounds, to produce a conventional chromate-free conversion layer on the substrate surface. This layer is subsequently dried or coated wet-on-wet with an aqueous solution comprising from 0.1 to 40 wt. %, preferably from 0.5 to 25 wt. %, of a low molecular weight compound containing at least one reactive polymerizable double bond and at least one reactive H group, as well as commercially available ionic or non-ionic emulsifiers, optionally amounts of hydrophilic solvents and further auxiliary substances. Molecular solutions, emulsions or suspensions are to be included. The coating agents can be applied by the mentioned methods, but it is also possible to bring the aqueous solution into contact with the conversion layer in the form of a simple rinsing bath.

A further procedure consists in reversing the sequence of the steps. In this case, the above-mentioned aqueous solution is applied to the optionally cleaned substrate and is optionally flashed off, and then a conversion agent known in principle is applied. The conversion layer so obtained also contains a sufficient amount of low molecular weight polymerizable compounds.

In a second step of the method according to the invention, coating agents that can be cured by radical polymerization are applied. Such coating agents are widely known in the literature and have been described for various purposes. They may be clear lacquer layers or pigmented systems. Liquid or pulverulent coating agents can be applied. It is possible to provide the corresponding layer as a primer with particular properties; for example, conductivity, weldability, corrosion protection, or decorative lacquer layers can be produced. Such systems consist, for example, of at least one radically polymerizable polymer, prepolymer or oligomer having unsaturated groups, reactive diluents or monomeric components, as well as auxiliary substances conventional in lacquers. Such auxiliary substances may be flow agents, solvents, adhesion promoters, thixotropic and anti-settling agents, pigments or colorings and, especially, polymerization initiators. In particular, prepolymers based on (meth)acrylate resins, optionally with further comonomers, have been found to be suitable. The initiators can be activated by heat, or they are photoinitiators. Examples of suitable lacquer systems curing by polymerization are described in DE-A 199 56 659, DE-A-199 25 631, U.S. Pat. No. 5,987,727, WO 2001091926 or EP 0783534.

The coating agents to be applied in the method according to the invention can be selected in view of the subsequent use. When the substrates are formed, flexible coating layers that do not crosslink too greatly are preferably advantageous. The layers may be colorless, in order to keep the substrate visible, but they may also be colored by means of colorings or pigments. In addition, particular additives can be used for specific applications, for example conductive and/or anticorrosive pigments. The coating agents comprise initiators, which are commercially available products sufficiently well known to the person skilled in the art. These coating agents are crosslinked by radical polymerization. If suitable initiators are used, polymerization can be carried out by means of heat. In the method according to the invention, however, preference is given to coating agents that comprise photoinitiators and can be crosslinked by actinic radiation.

The pretreated substrate surface is coated with a coating agent as a second layer by known methods. It must be ensured that the conversion layer formed in the first method step is not yet crosslinked. It should be dry; optionally, it may also have just started to dry and can thus be coated with the coating agent by the wet-on-wet method.

Application of the coating agent according to the invention is generally carried out at temperatures of from 10 to 90° C., preferably from 15 to 75° C. The coating layer can be crosslinked by means of heat; preferably, the coating is crosslinked by actinic radiation, such as, for example, UV radiation, electron radiation or γ radiation. Electron radiation should have energy values of from 50 to 500 keV. Preference is given to crosslinking by UV radiation, especially with a wavelength of from 150 to 800 nm, particularly preferably from 200 to 450 nm. Corresponding radiation sources are known to the person skilled in the art. The radiation intensity and the irradiation time depend on the method conditions, for example the distance of the radiation source or the relative movement between the source and the substrate. However, the time is generally less than 60 seconds, preferably from 0.001 to 30 seconds. The system parameters can be determined by the person skilled in the art by adaptation.

The layer thickness of the coating of conversion layer and coating agent that is to be cured is from 0.1 to 100 μm, preferably up to 20 μm, particularly preferably from 0.5 to 10 μm.

In the preferred case of coating by coil-coating, these are applied, for example, by spraying, squeezing, immersion, using a roller, by means of a roll coater or a spray nozzle. Coating by means of a roll coater is particularly preferred. The methods are known and can be adapted according to the installation that is used. In this embodiment, the individual method steps can be carried out immediately in succession. Crosslinking of the two layers is produced by actinic radiation, especially UV radiation. Once the coating has been crosslinked, the substrate can either be processed further directly or it is stored, for example in the form of wound coil.

The conversion layer can also be produced using a coating agent according to the invention. Aqueous solutions for producing a conversion layer are generally known and are described in the literature. For example, such solutions and application methods are described in EP-A 694 593, EP-A 792 922, U.S. Pat. No. 5,344,504, 5,427,632, WO 95/14117 or WO 95/04169. These are aqueous solutions, which generally have a pH below 6. They contain, for example, complex fluorides of Hf, B, Ti, Zr, Si, for example as hexafluorozirconic acid, hydrofluoric acid, hexafluorotitanic acid, hexafluorosilicates. The corresponding fluorides of the mentioned elements can be present in the aqueous solution in the form of fluoric acids or alkali metal and/or ammonium salts. Phosphate, manganate, vanadate, tungstate or molybdate ions and similar ions may also be present in the conversion solution.

The aqueous solutions are generally stable at an acidic pH; the pH is especially below 5. The aqueous solutions may comprise further auxiliary substances, for example reactive silanes, antifoams or wetting agents. Small amounts of organic polymers may further be present, for example poly(meth)acrylates, polyurethanes, epoxy resins, aminoplastic resins, phenolformaldehyde resins, polycarboxylic acids, polymeric alcohols and/or esterification products thereof, polyvinylphenols, homo- or co-polymers containing amino groups, or copolymers of vinylpyrrolidone. Such polymers are known and are described, for example, in DE-A-100 10 758.

The conventional known conversion solutions may be chosen as the principal constituent of the coating agent according to the invention. However, the solutions should be chromium- or chromate-free.

According to the invention there are present in the coating agent for producing the conversion layer low molecular weight compounds that contain at least one group capable of crosslinking by radical polymerization. Low molecular weight compounds are to be understood as being liquid or solid, monomeric or oligomeric compounds, or mixtures thereof, which contain on average one or more double bonds reactive in the polymerization, as well as a further H-active functional group. Polar and/or ionic components are contained in the molecule, and non-polar hydrophobic components. Compounds having such double bonds are, for example, esters or amides of low molecular weight unsaturated carboxylic acids, such as acrylic acid, methacrylic acid, crotonic acid, maleic acid, fumaric acid, etc., or polyester or polyether oligomers having lateral or terminal (meth)acrylic groups, or other monomers containing activated double bonds, such as functionalized vinyl ethers. Preference is given to compounds having acrylate groups and/or methacrylate groups. These compounds may contain a plurality of reactive, polymerizable double bonds, but they preferably have at least one reactive double bond. They generally have a molecular weight below 1000. These compounds further contain at least one H-active functional group, i.e. groups that are able to cleave protons. In the case of esters or amides of unsaturated acids, the COOH groups of the acid may be reacted with alcohols or amines which contain these H-active groups as further functionality. Such H-active groups are, for example, OH, SH, $NH_2$, NRH, HOOC, $HSO_3$, $HSO_4$, $(OH)_2$PO, $(HO)_2PO_2$, (OH) (OR)—PO or (OH) (OR)—$PO_2$ groups. Particular preference is given to acidic H-functional groups, especially carboxylic acid, sulfonic acids, phosphonic acids and phosphoric acid groups. They are commercially available, for example Cray Valley: SR 9050, SR 9051; UCB: Ebecryl 168, Ebecryl 170; Akros: Actilane 820; Rhodia: Sipomer PAM 100 and 200; Cognis: Photomer 4073, Photomer 2073; Rahn: Additiv 97-070, these products frequently being mixtures.

The amount of low molecular weight reactive compounds should be from 0.01 to 40 wt. %, preferably less than 25 wt. %, especially from 0.1 to 15 wt. %, particularly preferably from 0.5 to 10 wt. %. One chosen compound may be present in the conversion solution, or it is possible for a plurality of different compounds to be present in the same or different concentrations. In general, the compounds are mixtures of monomeric or oligomeric substances. The compounds are so chosen that they can be stably dispersed in the solution at the pH of the aqueous conversion solution. Their stability to phase separation or to precipitation of their constituents should be more than 3 hours, especially more than 24 hours. This can be affected by the choice of the low molecular weight compounds as well as by the pH value of the solution. However, it may be advantageous to add a commercially available emulsifier or emulsifier mixtures, which should also be active in acidic solution.

The unsaturated double bonds should be capable of crosslinking by radical polymerization. This can occur by the addition of thermal or radiation-sensitive radical initiators. However, it is particularly preferable for no radical initiators to be present in the coating agents for forming the conversion layer. The unsaturated double bonds should preferably react by crosslinking with actinic radiation.

It is possible, when stable solutions are obtained, for the aqueous solution for producing the conversion layer to be prepared in the form of a 1-component agent. This agent is usually prepared in concentrated form and then brought to a suitable viscosity and solids content with water shortly before application. The unsaturated compound used according to the invention is, then, contained in the concentrate. It is also possible, however, if the monomers are not sufficiently stable in the aqueous phase, to prepare a 2-component mixture. In this case, one component should consist especially of the aqueous concentrated solutions of a substantially known conversion agent, and the second component consists of the unsaturated reactive compounds, it optionally being possible for auxiliary substances, such as, for example, organic solvents, preferably polar organic solvents, dispersion aids, antifoams, to be present proportionally or solely in the second component. Immediately before application, the two components are mixed and optionally adjusted, with water, to a suitable application viscosity and suitable solids content for application, and the coating agent according to the invention is then ready for use over a prolonged period. Mixing is carried out using known mixing devices.

The method according to the invention gives a coating that adheres very well to the metal substrate and exhibits outstanding anticorrosive properties. With the selection of a suitable binder, a high degree of flexibility is obtained in further processing, and the coating does not become detached from the substrate. Good corrosion protection is observed even at these formed locations. The use of systems that crosslink by actinic radiation, with a crosslinking step, ensures a good bond to the substrate; short curing times can also be achieved, and correspondingly rapid processing can take place. It is found that energy consumption is also lower than with heat curing systems.

If the coatings are processed by coil-coating processes, it is advantageous to apply the coating agents using a roll coater. Individual solutions may optionally also be applied to the substrate as a rinsing bath. It is thus possible to achieve multiple coating with a small overall length of the coating installation.

The conversion solution according to the invention exhibits good application properties and can be adapted to the application conditions. Low foam formation is observed. Adhesion between the substrate and the coating layer is improved and is ensured even after possible forming.

The substrates coated according to the invention are suitable for a wide variety of different applications, for example in the automotive industry, in the domestic goods industry and in the construction industry. The Examples that follow are intended to explain the invention. It should be understood, however, that the invention is not limited to the specific details of the Examples.

EXAMPLES

Example 1

A pretreatment concentrate was prepared by mixing the indicated components (see Table 1 below, amounts are in wt. %). After intensive homogenization, the solution was ready for use. It can, if required, be diluted for application with demineralized water.

TABLE 1

|  | Example 1a | Example 1b |
|---|---|---|
| Demineralized water | 64.6 | 46.8 |
| ZnO |  | 4.8 |
| $H_3PO_4$ (75%) | 4.6 | 26.7 |
| $H_2TiF_6$ (50%) |  | 15.0 |
| $H_2TiF_6$ (60%) | 8.0 |  |
| Aminomethyl-substituted polyvinylphenol | 20.4 |  |
| Starch |  | 0.3 |
| Manganese(II) oxide | 2.4 | 5.2 |
| Molybdenum complex* |  | 1.2 |

*according to U.S. Pat. No. 5,683,816

Example 2

A UV-crosslinkable coating agent was prepared by mixing the components at room temperature (see Table 2, amounts in wt. %). The coating agent was then ready for application.

TABLE 2

|  | Example 2a | Example 2b |
|---|---|---|
| Urethane acrylate | 34.9 | 35.5 |
| Dipropylene glycol diacrylate | 19.5 | 8 |
| Trimethylolpropane formalacrylate | 34.3 | 34.9 |
| Phosphoric acid ester | 4.4 | 4.7 |
| Bis-(2,4,6-trimethylbenzoyl)-phenylphosphine oxide | 3.9 | 4.0 |
| 1-Hydroxycyclohexylphenyl ketone | 1.0 | 1.0 |
| Conductivity pigment | 2.0 | 0 |

Example 3

12 g of a mixture of mono-, di- and tri-esters of the phosphoric acid of 2-hydroxyethyl acrylate were added to 100 g of the solution from Example 1a or 1b, and intensive stirring was carried out for 5 minutes. Distilled water was added to this mixture 1:1. The pretreatment solution (Example 3a, 3b) was then ready for application. The pretreatment solution exhibited lower foam formation than the solution of Example 1 during processing.

The solution of Example 3a or 3b was applied to a dry HDG sheet-metal substrate which had been degreased with alkaline cleaners, and was applied with a roll coater. Drying was carried out for 5 minutes at 70° C. A coating agent according to Example 2 was then applied by means of a roll coater in a layer thickness of about 5 μm. The coatings were then immediately cured by irradiation with UV lamps (Fusion VPS/1600 type, H+D radiator, each 240 W/cm, 100% power) at a belt speed of 20 m/minute. T-bend and reverse impact tests were performed (see Table 3).

TABLE 3

| Pretreatment | Coating agent | T-bend | Reverse impact |
|---|---|---|---|
| 3a | 2a | 3 | 1 |
| 3a | 2b | 3-4 | 1-2 |
| 3b | 2a | 3 | 1-2 |
| 3b | 2b | 3-4 | 1-2 |

T-bend test: according to ECCA test method T7 [1996]: "Resistance to Cracking on Bending".

Reverse impact test: according to ECCA test method T5 [1985]: "Resistance to crack formation during rapid forming".

Analogous tests were also carried out using cold-rolled metal sheets and with aluminum as the substrate. The test results likewise showed an improved adhesion behavior of the pretreatment solutions according to Example 3.

Example 4

A degreased, dry HDG substrate was rinsed with a solution of 12 g of a homogeneous mixture of mono-, di- and tri-esters of phosphoric acid with 2-hydroxyethyl acrylate, 87 g of water and 1 g of a commercially available emulsifier. After brief evaporation of the water, a conversion layer was produced on the surface from a solution according to Example 1a. This conversion layer was dried for a short time and then coated with a coating agent according to Example 2a. The coating was cured as in Example 3. The coating adhered well to the substrate, and the corrosion protection was good.

Example 5

Comparison Tests

The procedure of Example 3 was followed, but the pretreatment solution according to Example 1 was used (see Table 4).

TABLE 4

| Pretreatment | Coating agent | T-bend | Reverse impact |
|---|---|---|---|
| 1a | 2a | 5 | 5 |
| 1a | 2b | 5 | 5 |

The comparison tests with the pretreatment solution without UV-curing component showed markedly poorer adhesion behavior.

Example 6

Comparison Tests 0.12% of an aqueous dispersion of bis-(2,4,6-trimethylbenzoyl)-phenyl-phosphine oxide was added to pretreatment solution 3a according to the invention, and the solution was applied as described in Example 3 to a cleaned HDG metal sheet, was dried and then cured with UV radiation under the conditions likewise indicated in Example 3. A coating agent according to Example 2a was then applied to the surface, and curing was again carried out with UV radiation (analogous conditions as previously). The coating exhibited poorer adhesion behavior (see Table 5).

TABLE 5

| Pretreatment | Coating agent | T-bend | Reverse impact |
|---|---|---|---|
| 3a | 2a | 3-4 | 5 |

Although the invention has been described with reference to preferred embodiments, it is to be understood that variations and modifications may be resorted to as will be apparent to those skilled in the art. Such variations and modifications are to be considered within the purview and scope of the claims appended hereto.

What is claimed is:

1. A method for coating a metal surface with a coating agent, comprising:
   a) optionally cleaning and/or degreasing a metal surface,
   b) applying an aqueous chromate-free conversion coating agent producing an uncrosslinked conversion layer,
   c) applying a coating agent based on binders crosslinkable by radical polymerization to the uncrosslinked conversion layer, and
   d) crosslinking the uncrossedlinked conversion layer together with the coating agent to form a crosslinked coating by radical polymerization,
      wherein the conversion layer comprises, in an amount of from 0.1 to 500 mg/m² of surface, low molecular weight compounds which contain groups crosslinkable by radical polymerization and H-active groups.

2. The method as claimed in claim 1, wherein the coating is crosslinked by actinic radiation.

3. The method as claimed in claim 2, wherein the coating is crosslinked by UV radiation.

4. The method as claimed in claim 2, wherein the coating is crosslinked by electron radiation.

5. The method as claimed in claim 1, wherein the aqueous chromate-free conversion coating agent comprises from 0.01 to 40 wt. % of low molecular weight compounds which contain groups crosslinkable by radical polymerization and H-active groups.

6. The method as claimed in claim 5, wherein the aqueous chromate-free conversion coating agent comprises low molecular weight compounds which contain on average at least one reactive double bond and at least one H-active group.

7. The method as claimed in claim 1, further comprising applying to the conversion layer before step (c), an aqueous initiator-free solution comprising at least one emulsifier, and from 0.1 to 40 wt. % of low molecular weight compounds which are crosslinkable by radical polymerization and contain at least one H-active group.

8. The method as claimed in claim 1, further comprising pretreating the substrate, after optional step (a) and before step (b), with an aqueous initiator-free solution comprising at least one emulsifier as well as from 0.1 to 40 wt. % of low molecular weight compounds which are crosslinkable by radical polymerization and contain an H-active group.

9. The method as claimed in claim 1, wherein the metal surface comprises a material based on iron materials, steel and alloyed steel, aluminum, magnesium, zinc and/or alloys thereof and/or correspondingly surface-coated materials.

10. The method as claimed in claim 9, wherein substrates in strip or sheet form comprise the metal surface.

11. The method as claimed in claim 1, wherein said coating agent comprises from 0.01 to 40 wt. % of at least one low molecular weight compound which contains at least one H-active group and at least one further functional group crosslinkable by radical polymerization, said group being selected from esters or amides of low molecular weight carboxylic acids, polyester or polyether oligomers having lateral or terminal (meth)acrylic groups, or other monomers which contain activated double bonds.

12. The method as claimed in claim 11, wherein the radically crosslinkable functional group is an unsaturated carboxylic ester or carboxamide group.

13. The method as claimed in claim 11, wherein the H-active group is an acidic group.

14. The method as claimed in claim 11, comprising as low molecular weight compound from 0.1 to 15 wt. % of acidic derivatives of phosphoric acid or phosphoric acid with (meth)acrylates.

15. The method as claimed in claim 11, wherein no polymerization initiators are present.

16. The method as claimed in claim 11, said coating agent comprising from 0.1 to 25 wt. % of the at least one low molecular weight compound.

17. The method as claimed in claim 12, wherein the radically crosslinkable functional group is an acrylic or methacrylic group.

18. The method as claimed in claim 11, wherein the H-active group is an acidic group selected from a carboxylic acid, a sulfonic acid, a phosphoric acid, a phosphonic acid and derivatives thereof.

19. A method for coating a metal substrate with a two-layer lacquer coating comprising:

d) applying to a metal substrate an aqueous chromate-free conversion coating agent producing an crosslinkable conversion layer comprising low molecular weight compounds which contain double bonds crosslinkable by radical polymerization and H-active groups, the crosslinkable conversion layer being free of polymerization initiators; and e) applying a second crosslinkable coating layer to the crosslinkable conversion layer; and f) crosslinking the two layers together by radiation.

20. The method as claimed in claim 19, wherein the second crosslinkable coating layer comprises a pulverulent or liquid coating agent.

21. The method as claimed in claim 19, further comprising the step of forming the metal substrate.

22. The method as claimed in claim 21, wherein further lacquer layers are applied before and/or after forming.

* * * * *